United States Patent [19]
Mitsuhashi et al.

[11] 4,075,433
[45] Feb. 21, 1978

[54] SIGNAL SWITCHING DEVICE

[75] Inventors: Sadayuki Mitsuhashi; Norio Suzuki; Kazuyoshi Nago, all of Tokyo, Japan

[73] Assignee: Nippon Electric Co., Ltd., Tokyo, Japan

[21] Appl. No.: 731,961

[22] Filed: Oct. 13, 1976

[30] Foreign Application Priority Data
Oct. 14, 1975  Japan ............................... 50-123921

[51] Int. Cl.² ..................... H01H 67/14; H04M 1/00; H04Q 3/00
[52] U.S. Cl. ................................ 179/18 GE; 335/112; 335/152; 340/166 S
[58] Field of Search ............... 179/18 GE; 340/166 S; 335/111, 112, 151, 152

[56] References Cited
U.S. PATENT DOCUMENTS

| 3,464,039 | 8/1969  | Takamura et al.   | 335/112 |
| 3,487,344 | 12/1969 | Takamura et al.   | 335/112 |
| 3,900,807 | 8/1975  | Hamada et al.     | 335/112 |
| 3,942,142 | 3/1976  | Kato et al.       | 335/112 |
| 3,953,813 | 4/1976  | Yano et al.       | 335/112 |
| 3,982,216 | 9/1976  | Mitsuhashi et al. | 335/152 |

Primary Examiner—Thomas A. Robinson
Attorney, Agent, or Firm—Sughrue, Rothwell, Mion, Zinn and Macpeak

[57] ABSTRACT

Signal switching devices employing electromagnetic switching elements having particular application in the switching network of automatic telephone exchanges are disclosed. The switching devices are of the kind comprising an input and output signal line electromagnetic switching matrix. The switching devices include a cutoff circuit and/or off-normal circuit integrated with the switching matrix.

5 Claims, 4 Drawing Figures

SIGNAL SWITCHING DEVICE

BACKGROUND OF THE INVENTION

The present invention relates to signal switching devices usable in the switching network of automatic telephone exchanges, and more particularly to those located on the subscriber or trunk terminals of the switching network and employing electromagnetic switching elements.

Signal switching devices of the kind described comprise an input and output signal line electromagnetic switching matrix which includes switching elements arranged at the points of intersection between a multitude of input signal lines and a multitude of output signal lines intersecting the input signal lines substantially at right angles thereto. These switching devices serve the purpose of switcing the input and output signal lines upon the application of control signals to the input and output control lines thereby to electromagnetically open and close the electromagnetic switching elements. A cutoff circuit is arranged to connect the call detector circuit with or disconnect it from the input signal lines and/or an off-normal circuit for preventing any interruption of direct currents due to operation of the switching elements in the switching matrix.

In the manufacture of switching devices of the kind described, conventional practice has been to design and fabricate a switching matrix, a cutoff circuit and/or an off-normal circuit independently from each other. This practice, however, has many disadvantages, includng limited use of parts in common to the different component circuits, increase in the number of individual parts required, need for wiring between the switching matrix and the circuits, and an increase in the cost of fabrication of the switching network as a whole. Moreover, this practice has precluded any substantial reduction in size, weight and fabrication cost of the device.

SUMMARY OF THE INVENTION

In view of the difficulties encountered in the prior art as described above, the present invention is intended to provide a novel switching device which includes a cutoff circuit and/or off-normal circuit integrated with a switching matrix arranged so as to eliminate any duplication of parts usable in common as with separately designed circuits and for wiring between the matrix and such circuits.

According to the present invention, there is provided a switching device which comprises a magnetic shunt plate having a first plurality of through apertures into which electromagnetic switching elements (for example, reed switches), for switching input and output lines are insertable and a second plurality of through apertures into which electromagnetic switching elements (for example, reed switches) for an off-normal and/or a cutoff circuit are insertable. Electromagnetic switching elements having a magnetic self-latching function are inserted in the first through apertures so as to extend through the magnetic shunt plate at the points of intersection between a plurality of input signal lines and a plurality of output signal lines. Electromagnetic switching elements are inserted in the second through apertures so as to extend through the magnetic shunt plate and connected with the input signal lines. A first and a second coil encircles all or each of the electromagnetic switching elements connected to each of the input signal lines. A third and a fourth coil encircle all or each of the electromagnetic switching elements connected to each of the output signal lines. A fifth coil encircles each of the electromagnetic switching elements inserted in the second through apertures.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENTS

Figure 1:
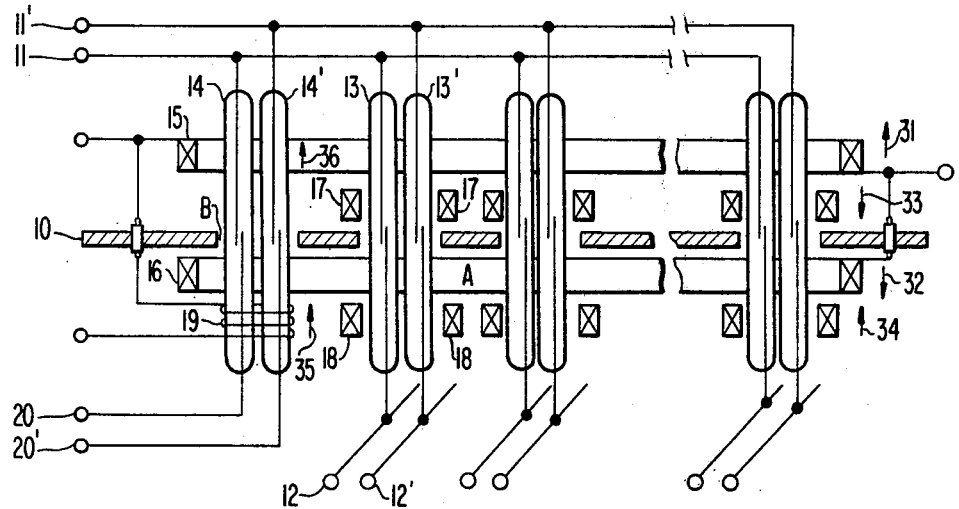
FIG. 1 is a diagrammatic cross-sectional view showing the construction of one form of switching device embodying the present invention and including a switching matrix and a cutoff circuit integrated therewith.
Figure 2:
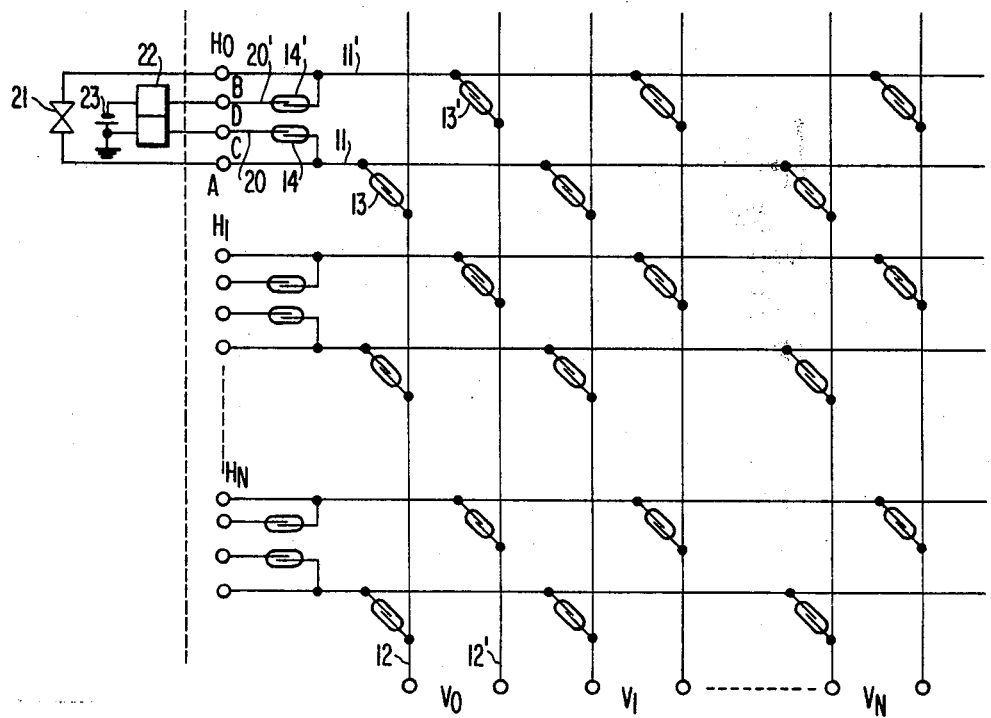
FIG. 2 is a circuit diagram illustrating the arrangement of signal lines and associated parts of the device shown in FIG. 1.

Referring first to FIG. 1, reference numeral 10 indicates a magnetic shunt plate having a first set of through apertures A in which switching elements for switching input and output lines are insertable to form a switch matrix of the device with rows $h_o$-$h_N$ and columns $V_o$-$V_N$ and also a second set of through apertures B in which electromagnetic switching elements for a cutoff circuit are insertable. More specifically, the magnetic shunt plate 10 is provided with a plurality of reed switches 13-13' having a magnetic self-latching function which are inserted in the first through apertures A so as to extend through the magnetic shunt plate 10 at the points of intersection between a plurality of input signal lines 11-11' and a plurality of output signal lines 12-12'. A plurality of reed switches 14-14' having a magnetic self-latching function are inserted in the second through apertures B so as to extend the magnetic shunt plate 10 and are connected at one end to the input signal lines 11-11' and at the other end to signal lines 20-20'. A plurality of exciting coils 19 encircle the reed switches 14-14'. A first and a second coil 15 and 16 encircle each row of the reed 13-13' and 14-14' connected to each pair of the input signal lines 11-11' and a third and a fourth coil 17 and 18 encircle each column of the reed switches 13-13' connected to each pair of output signal lines 12-12'. As shown in FIG. 2, subscriber lines 21 are connected to the input signal lines 11-11' at terminals A and B, while a line relay 22 and a source of power 23 are connected to the signal lines 20-20' at terminals C and D. Such connection, however, does not form any part of the present invention and will not be described in any detail. The circuit connection of the first, second, third, fourth and fifth coils 15, 16, 17, 18 and 19 varies with means for excitation selection of reed switches 13-13', 14-14', which are excited, in this embodiment, in the manner illustrated in FIG. 3. As shown in that figure, coils 15, 16 are distinct for each row ($_o$-$h_N$) and coils 17, 18 extend the entire column length ($V_o$-$V_N$).

Figure 3:
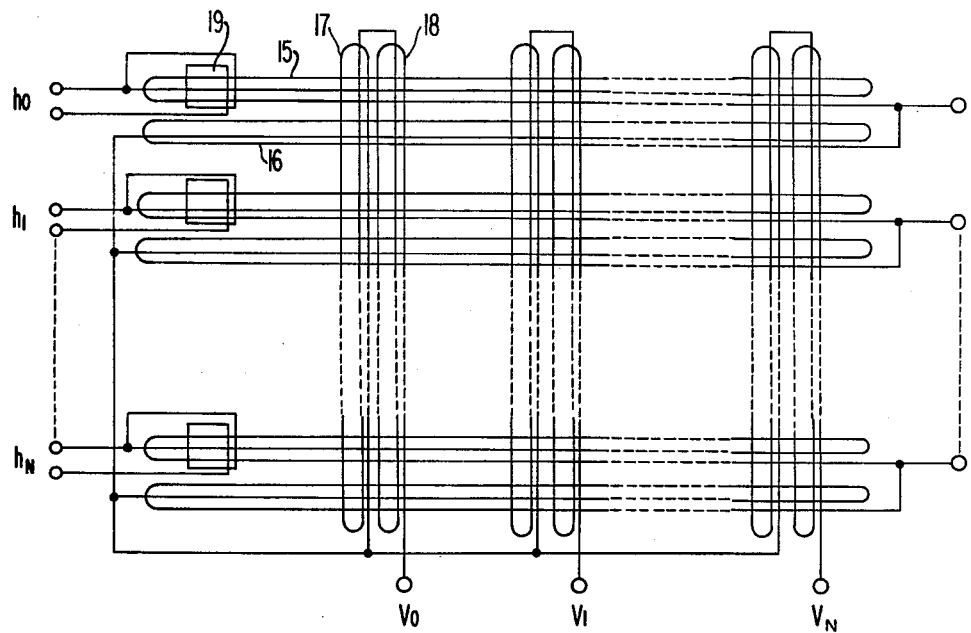
FIG. 3 is a connection diagram of the coils shown in FIG. 1.

Description will now be made of the method of excitation with reference to FIGS. 1 and 3. First, in order to open the electromagnetic switching elements 14-14' positioned in the through aperture B, pulse currents are fed through the associated first and second coils 15 and 16 to excite electromagnetic switching element 14-14' by the magnetic field of coil 15 in the direction of arrow 31 and the coil 16 in the direction of arrow 32. As a result, the reed switches 14-14', having a magnetic self-latching function, will open, being magnetized in mutually opposite directions on the respective sides of the magnetic shunt plate 10, and signal lines 20-20' are separated from the input signal lines 11-11'. On the other hand, in order to close the electromagnetic switching elements 14-14', pulse currents are fed through the first and fifth coils 15 and 19 to excite electromagnetic switching elements 14-14' by the magnetic field of these coils in an additive direction, as indicated by arrows 36 and 35, respectively. In this manner, reed switches 14-14' are caused to close, connecting the signal lines 20-20' to the input signal lines 11-11'. The electromagnetic switching elements 13-13' are closed by exciting the first and fourth coils 15 and 18 in an additive direction, as indicated by arrows 31 and 34, and opened by exciting the first and second coils 15 and 16 as indicated by arrows 31 and 32 or by exciting the third and fourth coils 17 and 18 as indicated by arrows 33 and 34. Although for such switching operation the coils in this embodiment are connected as shown in FIG. 3, it is to be understood that, in the present invention, the directions of exciting magnetic fields produced by the coils and their connections may be changed in the manner well known with reed switches. Further, although in the embodiment shown, the first, second, third and fourth coils, 15, 16, 17 and 18 are each formed so as to encircle all of the electromagnetic switching elements 13-13', 14-14' connected to each input or output signal lines 11-11' or 12-12', it will be apparent that the same purpose can also be served satisfactorily by use of coils formed separately to encircle the individual electromagnetic switching elements 13-13', 14-14'.

Though the embodiment described above has been explained as one with a cutoff circuit integrated therein, the electromagnetic switching elements 14-14' can also be utilized as switching contacts of an off-normal circuit by employing a circuit arrangement only including terminals C and D on the input side.

As will be apparent from the foregoing description, the embodiment shown does not necessitate any wiring operation as required with the use of a cutoff circuit separately fabricated, and the switching device with its electromagnetic switching elements 14-14', signal lines 20-20' and fifth coils 19 removed therefrom is substantially the same in structure as conventional switching devices, enabling use of much increased number of common parts and hence substantial reduction in size, weight and fabrication cost of the device.

Though the embodiment shown and described above forms a 2-wire type of switching device, it will be apparent to those skilled in the art that the present invention can also be applied to single-wire systems as well as to three-wire and other multiple-wire systems with the same successful results.

Figure 4:
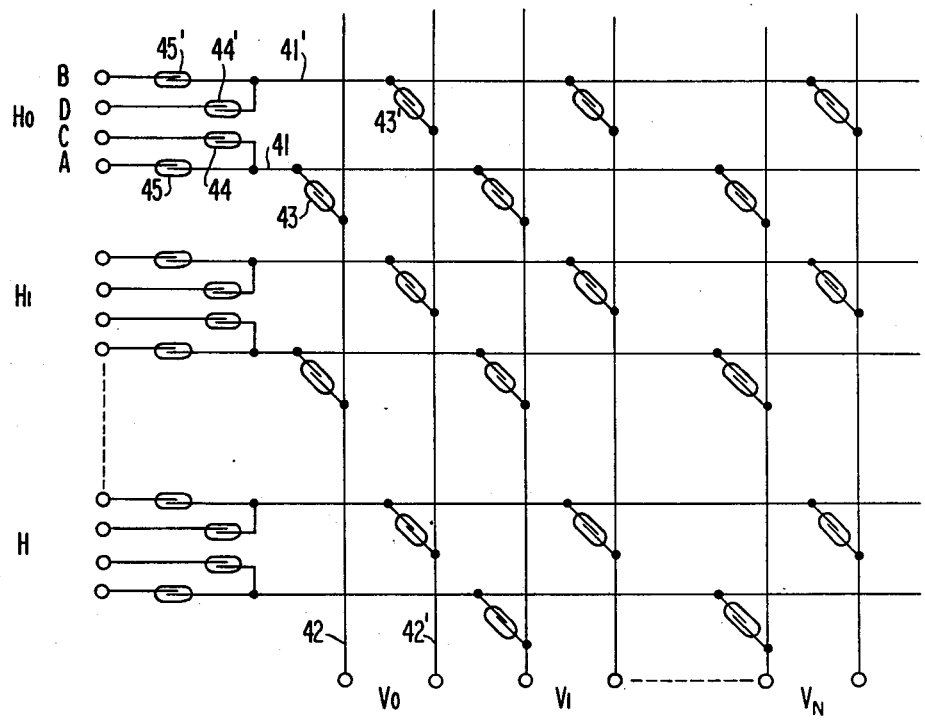
FIG. 4 is a signal circuit diagram of another embodiment of the invention.

Reference will next be made to FIG. 4, which illustrates the signal-side circuit arrangement of another embodiment of the present invention. This switching device is comprised of a switching matrix and a cutoff and an off-normal circuit both integrated therewith. Reference numerals 44-44' indicate cutoff contacts, and 45-45' off-normal contacts. The magnetic shunt plate in this embodiment is formed in substantially the same manner as in the embodiment previously described, with a plurality of through apertures formed therein, in which electromagnetic switching elements are inserted, and with additional reed switches 45-45' and fifth coils assembled thereon. Reference numerals 41-41' indicate input signal lines; 42-42' indicate output signal lines; and 43-43' indicate reed switches having a magnetic self-latching function and arranged to shortcircuit the input and output signal lines 41-41' and 42-42'.

As will be readily appreciated from the foregoing description, according to the present invention, a cutoff circuit and/or an offnormal circuit can be integrated with a switching matrix, and this facilitates common use of parts, enabling substantial reduction in size, weight and cost of fabrication of the signal switching device.

While the invention has been described in terms of two preferred embodiments, those skilled in the art will recognize that these embodiments are only exemplary in construction and arrangement within the scope of the invention as defined in the appended claims.

What is claimed is:

1. A signal switching device comprising:
 a magnetic shunt plate having a first set of through apertures arranged in crossing rows and columns and a second set of through apertures formed in a column adjacent to said first set of through apertures;
 electromagnetic switching elements inserted into the respective through apertures in the first and second sets through apertures so as to extend through the magnetic shunt plate;
 first and second coil means associated with each row arranged on the opposite faces of said magnetic shunt plate in the direction of the rows of said through apertures for excitation of said electromagnetic switching elements inserted in said first and second sets of through apertures;
 third and fourth coil means associated with each column arranged on the opposite faces of said magnetic shunt plate in the direction of the columns of said first set of through apertures for excitation of said electromagnetic switching elements inserted in said first set of through apertures; and
 fifth coil means for exciting said electromagnetic switching elements inserted in said second set of through apertures.

2. A signal switching device as recited in claim 1, further comprising a plurality of input lines arranged in rows and connected on one side of said magnetic shunt plate to the ends of said electromagnetic switching elements in corresponding rows of said first set of through apertures, and a plurality of output lines arranged in columns on the other side of said magnetic shunt plate and connected to the ends of said electromagnetic switching elements in corresponding columns of said first set of through apertures so that energization of said first and fourth coil means causes the closing of selected ones of said electromagnetic switching elements to short circuit selected input and output lines.

3. A signal switching device as recited in claim 2, wherein subscriber lines are adapted to be connected to said input lines and said electromagnetic switching elements in said second set of through apertures are cutoff contacts, one end of said cutoff contacts being connected to corresponding ones of said input lines and the other end of said cutoff contacts being adapted to be connected to signal lines so that energization of said first and second coil means causes the opening of said cutoff contacts to disconnect said signal lines from said input lines and energization of said first and fifth coil means causes the closing of selected ones of said cutoff contact to connect selected signal lines to correspondng input lines.

4. A signal switcing device as recited in claim 2, wherein said electromagnetic switching elements in said second set of through apertures are off-normal contacts and subscriber lines are adapted to be connected to said input lines by means of said off-normal contacts so that energization of said first and second coil means causes the opening of said off-normal contacts to disconnect said subscriber lines from said input lines and energization of said first and fifth coil means caues the closing of selected ones of said off-normal contacts to connect selected subscriber lines to corresponding input lines.

5. A signal switching device as recited in claim 2, wherein half of said electromagnetic switching elements in said second set of through apertures are off-normal contacts and the other half of said electromagnetic switching elements in said second set of through apertures are cutoff contacts, and wherein subscriber lines are adapted to be connected to said input lines by means of said off-normal contacts and one end of said cutoff contacts are connected to corresponding ones of said input lines and the other end of said cutoff contacts are adapted to be connected to signal lines so that energization of said first and second coil means causes the opening of said off-normal contacts and of said cutoff contacts to disconnect said subscriber lines and said signal lines from said input lines and energization of said first and fifth coil means causes the closing of selected ones of said off-normal contacts and said cut-off contacts to connect selected subscriber lines and signal lines to corresponding input lines.

* * * * *

UNITED STATES PATENT OFFICE
CERTIFICATE OF CORRECTION

Patent No. 4,075,433                Dated February 21, 1978

Inventor(s) Sadayuki MITSUHASHI et al

It is certified that error appears in the above-identified patent and that said Letters Patent are hereby corrected as shown below:

IN THE SPECIFICATION:

Column 2, line 43 - after "extend" insert -- through -- line 48 - after "reed" insert -- switches -- line 63 - delete "($_o$-$h_N$)" insert ($h_o$-$h_N$) --

Column 4, line 11 - delete "offnormal" insert -- off-normal --

IN THE CLAIMS:

Column 4, line 29 - after "sets" insert -- of --

Signed and Sealed this

Twenty-seventh Day of June 1978

[SEAL]

Attest:

RUTH C. MASON
*Attesting Officer*

DONALD W. BANNER
*Commissioner of Patents and Trademarks*